(12) United States Patent  
Kizaki (10) Patent No.: US 8,932,548 B2  
(45) Date of Patent: Jan. 13, 2015

(54) SILICON OXIDE AND NEGATIVE ELECTRODE MATERIAL FOR LITHIUM-ION SECONDARY BATTERY

(75) Inventor: Shingo Kizaki, Amagasaki (JP)

(73) Assignee: OSAKA Titanium technologies Co., Ltd., Hyogo (JP)

( * ) Notice: Subject to any disclaimer, the term of this patent is extended or adjusted under 35 U.S.C. 154(b) by 593 days.

(21) Appl. No.: 13/377,249

(22) PCT Filed: Apr. 21, 2010

(86) PCT No.: PCT/JP2010/002857  
§ 371 (c)(1),  
(2), (4) Date: Dec. 9, 2011

(87) PCT Pub. No.: WO2006/011290  
PCT Pub. Date: Feb. 2, 2006

(65) Prior Publication Data  
US 2012/0085974 A1    Apr. 12, 2012

(30) Foreign Application Priority Data  
Jun. 19, 2009 (JP) ................... 2009-146267

(51) Int. Cl.  
*C01B 33/113* (2006.01)  
*H01M 4/485* (2010.01)  
(Continued)

(52) U.S. Cl.  
CPC ............ *H01M 4/485* (2013.01); *C01B 33/113* (2013.01); *H01M 4/134* (2013.01); *H01M 10/0525* (2013.01); *Y02E 60/122* (2013.01)  
USPC ...................................... 423/325; 252/182.1

(58) Field of Classification Search  
USPC ........................................ 252/182.1; 423/325  
See application file for complete search history.

(56) References Cited

U.S. PATENT DOCUMENTS 6,830,786 B2 * 12/2004 Yuda et al. .................... 427/579

FOREIGN PATENT DOCUMENTS

| EP | 1 236 682 | 9/2002 |
| EP | 2 282 161 | 2/2003 |

(Continued)

OTHER PUBLICATIONS

Y. Cros et al., "IR, ESR and Resistivity . . . At Low Temperature", Journal of Non-Crystalline Solids 90 (1987), pp. 2897-290.

(Continued)

*Primary Examiner* — Mark Kopec  
*Assistant Examiner* — Haidung Nguyen  
(74) *Attorney, Agent, or Firm* — Clark & Brody (57) ABSTRACT

A silicon oxide for use as a negative electrode active material of a lithium-ion secondary battery is characterized by: a g-value measured by an ESR spectrometer is in the range of not less than 2.0020 to not more than 2.0050; and given that A, B, and C are the area intensities of peaks near 420 cm$^{-1}$, 490 cm$^{-1}$ and 520 cm$^{-1}$ respectively in a Raman spectrum measured by a Raman spectroscopy, A/B is not less than 0.5 and C/B is not more than 2. The lithium-ion secondary battery has excellent cycle characteristic and initial efficiency in addition to high capacity. The silicon oxide preferably has a spin density in the range of not less than $1\times10^{17}$ spins/g to not more than $5\times10^{19}$ spins/g. A negative electrode material for the lithium-ion secondary battery contains not less than 20% by mass of this silicon oxide as a negative electrode active material.

3 Claims, 2 Drawing Sheets

(51) Int. Cl.
    *H01M 4/134*    (2010.01)
    *H01M 10/0525*  (2010.01)

(56) References Cited

FOREIGN PATENT DOCUMENTS

| | | |
|---|---|---|
| JP | 05-174818 | 7/1993 |
| JP | 06-060867 | 3/1994 |
| JP | 11-102705 | 4/1999 |
| JP | 2997741 | 11/1999 |
| JP | 2000-215887 | 8/2000 |
| JP | 2000-243396 | 9/2000 |
| JP | 4199871 | 10/2000 |
| JP | 2004-349238 | 12/2004 |
| JP | 2007-053084 | 3/2007 |
| WO | 2006/011290 | 2/2006 |
| WO | 2009/069506 | 6/2009 |

OTHER PUBLICATIONS

Bratus et al., "Structural Transformations . . . In SiOx Films", Semiconductors, vol. 35, No. 7, pp. 821-826, 2001.

* cited by examiner

SILICON OXIDE AND NEGATIVE ELECTRODE MATERIAL FOR LITHIUM-ION SECONDARY BATTERY

TECHNICAL FIELD

The present invention relates to a silicon oxide which can be used as a negative electrode active material for a lithium-ion secondary battery having an excellent cycle characteristic and an initial efficiency in addition to high capacity, and to a negative electrode material for lithium-ion secondary battery using the silicon oxide.

BACKGROUND ART

With recent remarkable developments in portable electronic equipments, communication equipments and the like, developments of secondary batteries with high density of energy are strongly demanded from the viewpoint of economic efficiency and reduction in size and weight of the equipment. Current secondary batteries with high density of energy include a nickel-cadmium battery, a nickel-hydrogen battery, a lithium-ion secondary battery, a polymer battery and the like. Among these batteries, the demand for the lithium-ion secondary battery is highly growing in a market of power source due to its dramatically enhanced life and capacity, compared with the nickel-cadmium battery or nickel-hydrogen battery.

Essentially differed from the principle of operation in a metal lithium battery as a primary battery, the lithium-ion secondary battery is based on the principle of operation such that lithium ions move forwards and backwards between a positive electrode and a negative electrode by charging and discharging. Therefore, in the lithium-ion secondary battery, shapes of positive electrode material and negative electrode material are unchanged in the course of by charging and discharging.

Meanwhile, a polymer battery is said to be smaller in energy density than the lithium-ion secondary battery. However, since the polymer battery can be made in a form of a sheet with 0.3 mm or less in thickness by using the same positive electrode, negative electrode and solid or gel electrolyte as those in the lithium-ion secondary battery, it is easy to make a package, so that a thinner type is highly expected to be produced. In view of such a characteristic of the polymer battery, it is increasingly demanded to develop a lithium-ion secondary battery enhanced in heat resistance and or liquid leakage resistance by using a polymer as an electrolyte.

Figure 3:
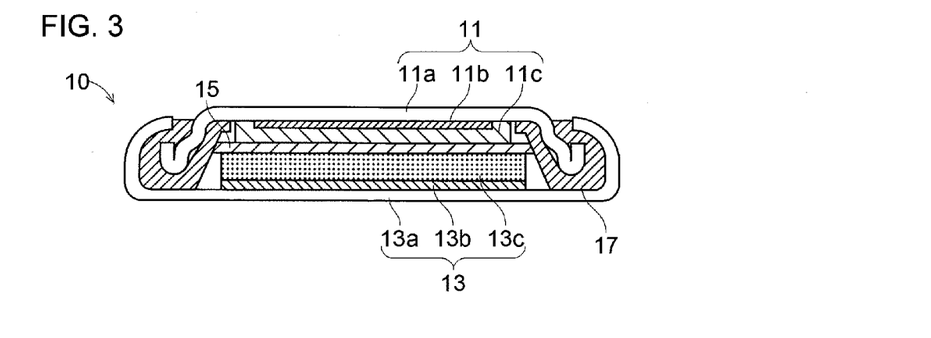
FIG. 3 is a view showing a configuration example of a coin-shaped lithium-ion secondary battery using the silicon oxide and negative electrode material for lithium-ion secondary battery of the present invention.

Such a lithium-ion secondary battery includes, as shown in the after-mentioned FIG. 3, a positive electrode, a negative electrode, an electrolyte and a separator. Lithium cobaltate ($LiCoO_2$) or manganese spinel ($LiMn_2O_4$) is primarily applied to the positive electrode of the lithium-ion secondary battery. A nonaqueous electrolytic solution mainly composed of an organic solvent, such as lithium perchlorate, is primarily applied to an electrolytic solution used as the electrolyte. The separator comprises a film which separates the positive electrode and the negative electrode from each other to prevent short-circuit between both the electrodes.

It is required for an active material used for the negative electrode of the lithium-ion secondary battery to have a large exploitable energy per unit weight or per unit volume to enhance the capacity of the lithium-ion secondary battery.

Negative electrode active materials for such a lithium-ion secondary battery, which have been proposed, include, for example, a composite oxide of lithium and boron in Patent Literature 1, a composite oxide of lithium and transition metal (V, Fe, Cr, Co, Ni, etc.) in Patent Literature 2, a chemical compound including at least one of Si, Ge and Sn, nitrogen and oxygen in Patent Literature 3, and an Si particle with a surface coated with a carbon layer by chemical vapor deposition in. Patent Literature 4.

Each of the negative electrode active materials proposed in Patent Literatures 1 to 4 can improve the charging-discharging capacity of the lithium-ion secondary battery to enhance the density of energy. However, in association with the charging and discharging of this lithium-ion secondary battery, the deterioration becomes eminent due to generation of dendrite and or a passive chemical compound on the electrode, or the expansion and contraction in occlusion and release of lithium ions significantly take place.

Therefore, this lithium-ion secondary battery is insufficient in the retention capability of discharging capacity for repeated charging and discharging (hereinafter referred also to as "cycle characteristic"). Further, required characteristics on lithium-ion secondary battery are not necessarily satisfied since the charging capacity does not achieve a large capacity exceeding 372 mAh/g in use of carbon as a negative electrode active material, and the initial efficiency that is represented by a ratio of discharging capacity to charging capacity (discharging capacity±charging capacity) of lithium-ion secondary battery just after mill production thereof is insufficient, and further improvements in the density of energy are desired.

To respond to such demands, it has been conventionally attempted to use a silicon oxide such as SiO as a negative electrode active material. The silicon oxide can be a negative electrode active material having a larger effective charging/discharging capacity, since it is low (less noble) in electrode potential to lithium and is inhibited from the deterioration such as collapse of crystal structure or generation of an irreversible substance due to occlusion and release of lithium ions during charging/discharging, and can reversibly occlude and release the lithium ions. Therefore, the silicon oxide can be expected, by using it as the negative electrode active material, to provide a secondary battery high in voltage and density of energy and also excellent in charging-discharging characteristic and cycle characteristic.

As efforts about the above-mentioned negative electrode material, for example, proposed in Patent Literature 5 is a non-aqueous electrolyte secondary battery using a silicon oxide, which allows occlusion and release of lithium ions, as the negative electrode material. This proposed silicon oxide contains lithium in its crystal structure or amorphous structure, and constitutes a composite oxide of lithium and silicon so that lithium ions can be occluded and released by electrochemical reaction in a non-aqueous electrolyte.

In the secondary battery proposed in Patent Literature 5, a high-capacity negative electrode active material can be obtained. However, according to the present inventors' studies, there is still room for further improvements toward the practical use since the irreversible part in capacity thereof in the initial charging/discharging is large, and the cycle characteristic is not sufficiently developed to a practical level.

In a lithium-ion secondary battery and a method for manufacturing the same proposed in Patent Literature 6, the negative electrode active material includes an oxide particle containing at least one element selected from a group consisting of Si, Sn, Ge, Al, Zn, Bi and Mg and a carbonaceous substance particle, said oxide particle being embedded in said carbonaceous substance particle.

In the manufacturing of the lithium-ion secondary battery proposed in Patent Literature 6, as described in embodiments thereof, a composite powder in which SiO particle is embedded in graphite particle, for example, by repetitively applying mechanical pressure bonding to amorphous SiO particle and natural graphite particle is used as a raw material to form an electrode by pressure molding for use as a negative electrode. Therefore, conductivity itself can be given to the pressure-molded negative electrode material. However, since the pressure molding is mechanical pressure bonding of one solid with the other, there arises a problem such that a uniform carbon film cannot be formed, so a uniform conductivity cannot be secured.

In Patent Literature 7, proposed as a negative electrode material for secondary battery is a composition prepared by mixing a silicon-based negative electrode active material including silicon or a silicon oxide doped with at least one element selected from those belonging to the $13^{th}$ and $15^{th}$ groups in the Periodic Table with a conductivity imparting agent, and as an example thereof, using silicon doped with boron as the negative electrode active material is described.

A negative electrode active material including simple silicon doped with boron, which is described as an example in Patent Literature 7, has an initial discharging capacity as large as 3000 mAh/g, and is improved in cycle characteristic and initial efficiency, compared with the one without boron-doping. However, the charging/discharging capacity is reduced to about 80% of the initial level after ten times of charging/discharging, and the cycle characteristic thus does not reach a practical level.

Examples with respect to silicon oxides are not described in Patent Literature 7.

CITATION LIST

Patent Literature

Patent Literature 1: Japanese Patent Application Publication No. 5-174818
Patent Literature 2: Japanese Patent Application Publication No. 6-60867
Patent Literature 3: Japanese Patent Application Publication No. 11-102705
Patent Literature 4: Japanese Patent Application Publication No. 2000-215887
Patent Literature 5: Japanese Patent No. 2997741
Patent Literature 6: Japanese Patent Application Publication No. 2000-243396
Patent Literature 7: Japanese Patent No. 4199871

SUMMARY OF INVENTION

Technical Problem

As described above, negative electrode active materials using silicon or silicon oxides, which have been proposed so far, have problems such that neither the cycle characteristic nor the initial efficiency of lithium-ion secondary battery reach a practical level.

In consideration of these problems, the present invention has an object to provide a negative electrode active material for a lithium-ion secondary battery having an excellent cycle characteristic and an initial efficiency in addition to high capacity, and a negative electrode material for lithium-ion secondary battery using this negative electrode active material.

Solution To Problem

To solve the above-mentioned problems, the present inventors made studies on potential silicon oxides to attain a higher capacity of lithium-ion secondary battery as a negative electrode active material, as well as on deterioration of cycle characteristic of a lithium-ion secondary battery using such a silicon oxide as the negative electrode active material. As a result, it was found that both of a g-value of silicon oxide, measured by an ESR (electron spin resonance) spectrometer, and a peak area intensity ratio thereof, calculated from a Raman spectrum measured by a Raman spectroscopy, have relationships with the deterioration of cycle characteristic. These relationships will be detailed as below.

The present inventors found that when the g-value of silicon oxide, measured by the ESR spectrometer, is in the range of not less than 2.0020 to not more than 2.0050, a lithium-ion secondary battery using this silicon oxide as the negative electrode active material shows excellent cycle characteristic. Four types of bonding of $Si\equiv Si_2O$, $Si\equiv SiO_2$ and $Si\equiv SiO_3$ exist in silicon oxide as the type of bonding, each composed of a silicon atom having a dangling bond and other atoms existing close thereto. Using the ESR spectrometer, the g-value of the silicon oxide can be measured by detecting the dangling bond resulting from these types of bonds.

FIG. 1 are schematic views of the types of bonding each composed of a silicon atom(s) having a dangling bond and other closest atoms in silicon oxides, wherein (a), (b), (c) and (d) show $Si\equiv Si_3$ bonding, $Si\equiv Si_2O$ bonding $Si\equiv SiO_2$ bonding, and $Si\equiv O_3$ bonding respectively. In the same figures, the g-value of each type of bonding is described with the schematic view thereof As is apparent from the same figures, the more the Si—Si bonds there are, the larger the g-value, and the more the Si—O bonds there are, the smaller the g-value.

The silicon oxide used as the negative electrode active material expands by occluding lithium ions during charging, and this expansion does not disappear even when the lithium ions are released during discharging. Therefore, this silicon oxide increasingly expands with repeated charging and discharging of the lithium-ion secondary battery. The more the Si—Si bonds are, the larger the expansion rate of the silicon oxide is, when lithium ions are occluded during charging, and the more the Si—O bonds are, the smaller it is. Namely, the larger the g-value, the larger the expansion rate of the silicon oxide becomes when occlusion of lithium ions takes place during charging. This is because the more the Si—O bonds are, the more strains the silicon oxide includes inside thereof, and the expansion of the silicon oxide is alleviated by these strains even if it occludes the lithium ions during charging.

Therefore, as found by the present inventors, a lithium-ion secondary battery using a silicon oxide with a large g-value exceeding 2.0050 as a negative electrode active material has fewer cycles of charging/discharging until it becomes disabled by expansion, thereby being inferior in cycle characteristic in comparison with the case of a g-value of not more than 2.0050. In addition to this fact, the present inventors found that the lithium-ion secondary battery using the silicon oxide with the large g-value exceeding 2.0050 as the negative electrode active material is inferior also in initial efficiency. This is because the more the Si—Si bonds, the more unlikely the lithium ions occluded during charging are released.

However, among silicon oxides with g-values of not more than 2.0050, the one with a g-value of less than 2.0020 is low in electric conductivity in spite of a reduced expansion rate, since the Si—O bonds are excessive, namely, the content of oxygen is excessive, so that it hardly functions as a negative electrode and cannot exhibit battery performance.

Next, the peak area intensity ratio calculated from Raman spectrum will be described.

Figure 1A:
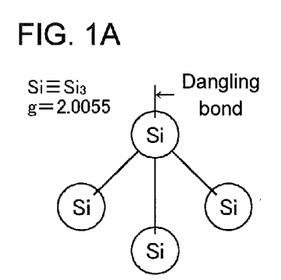
FIG. 1(a) shows Si≡Si$_3$ bonding.
Figure 1B:
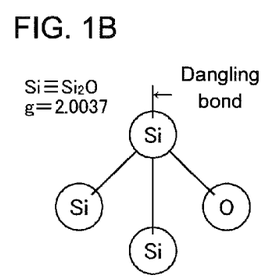
FIG. 1(b) shows Si≡Si$_2$O bonding.
Figure 1C:
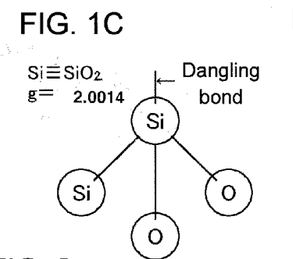
FIG. 1(c) shows Si≡SiO$_2$ bonding.
Figure 1D:
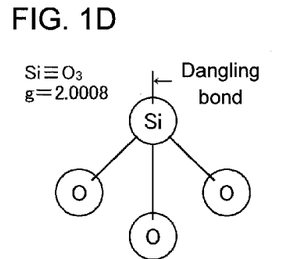
FIG. 1(d) shows Si≡O$_3$ bonding.
Figure 2:
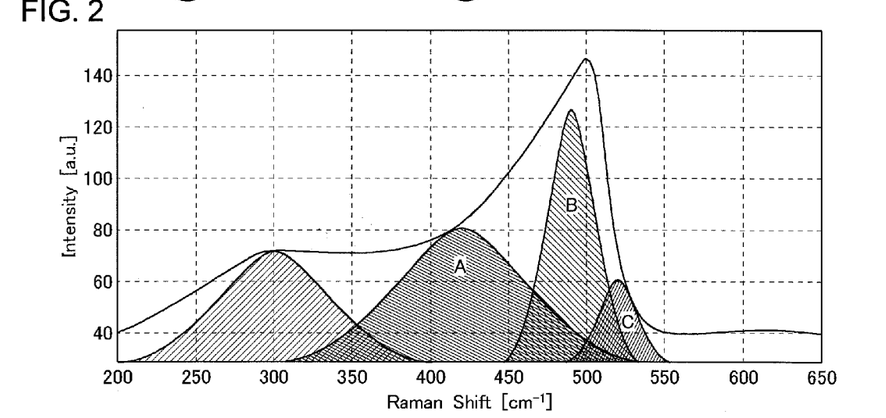
FIG. 2 is a view showing one example of a Raman spectrum measured for a silicon oxide.

FIG. 2 is a view showing one example of a Raman spectrum measured for a silicon oxide. As shown in the same figure, each of peaks near 300 cm$^{-1}$, 420 cm$^{-1}$, 490 cm$^{-1}$ and 520 cm$^{-1}$ in the Raman spectrum is configured to have a peak curve represented by the normal curve, wherein the half value width and the height of each normal curve is adjusted based on the Raman spectrum. Preferable ranges of the peaks near 420 cm$^{-1}$, 490 cm$^{-1}$ and 520 cm$^{-1}$ are 420±5 cm$^{-1}$, 490±10 cm$^{-1}$ and 520±5 cm$^{-1}$, respectively. Based on the peak curves of the respective peaks near 420 cm$^{-1}$, 490 cm$^{-1}$, and 520 cm$^{-1}$, area intensities of A, B, and C respectively are measured. At that time, it was found that a lithium-ion secondary battery using, as the negative electrode active material, in view of AB and C/B, i.e. ratios of these area intensities, a silicon oxide satisfying A/B>0.5 and C/B<2.0 is excellent in cycle characteristic, compared with a lithium-ion secondary battery using a silicon oxide which does not satisfy these relations. The reason why this characteristic has been obtained will be described hereafter.

In the Raman spectrum, each of the peaks at 420 cm$^{-1}$ and 490 cm$^{-1}$ is detected from an amorphous cluster in the silicon oxide, and the peak at 520 cm$^{-1}$ is detected from a cluster constituting a crystal. The peak at 420 cm$^{-1}$ is the one obtained from a cluster with less orderliness than in the peak at 490 cm$^{-1}$. The orderliness means the closeness of the structure of an amorphous cluster having no crystalline peak by XRD or Raman spectroscopy to a crystal structure (diamond lattice in case of silicon). Thus, the silicon oxide becomes lower in the crystallinity of cluster as CB becomes smaller, becomes lower in the orderliness of cluster as A/B becomes larger, thus resulting in including more strains inside thereof. Therefore, when such a silicon oxide is used as the negative electrode active material of a lithium-ion secondary battery, the expansion by intrusion of lithium ions during charging is highly likely to be alleviated.

Further, the present inventors found that when the spin density of the silicon oxide with the g-value and peak area intensity ratios in Raman spectrum satisfying the above-mentioned conditions is within a specific range, namely, to be specific, when the spin density is in the range of not less than 1×10$^{17}$ spins/g to not more than 5×10$^{19}$ spins/g, a lithium-ion secondary battery using this silicon oxide as the negative electrode active material can have excellent cycle characteristic and initial efficiency. The reason why this characteristic is obtained will be described hereafter. The spin density of the silicon oxide can be measured with the ESR spectrometer.

The silicon oxide includes more defects such as strains and a dangling bond as the spin density becomes higher. Therefore, when used as the negative electrode active material of a lithium-ion secondary battery, the expansion due to intrusion of lithium ions during charging is more likely alleviated as the spin density becomes higher, and the cycle characteristic is consequently improved with a reduced expansion rate. However, if the spin density is excessively high, the initial efficiency is deteriorated since internal defects of the silicon oxide are overmuch, causing a vacancy cluster or the like to form and make it difficult for the lithium ions intruded during charging to release during discharging.

The present invention is achieved based on the above-mentioned findings, and summaries thereof lie in (1) a silicon oxide and (2) a negative electrode material for lithium-ion secondary battery described below.

(1) A silicon oxide to be used for a negative electrode active material of a lithium-ion secondary battery, characterized in that a g-value measured by an ESR spectrometer is in the range of not less than 2.0020 to not more than 2 0050, and given that A, B and C are the area intensities of peaks near 420 cm$^{-1}$, 490 cm$^{-1}$ and 520 cm$^{-1}$ respectively in a Raman spectrum measured by a Raman spectroscopy, A/B is not less than 0.5 and C/B is not more than 2.

The silicon oxide described in (1) preferably has a spin density in the range of not less than 1×10$^{17}$ spins/g to not more than 5×10$^{19}$ spins/g.

(2) A negative electrode material for lithium-ion secondary battery, characterized by containing not less than 20% by mass of the silicon oxide described in (1).

The "silicon oxide" in the present invention means SiOx (0<x<2). The "negative electrode material for lithium-ion secondary battery contains not less than x % by mass of silicon oxide" in the present invention means that, among constituents of the negative electrode material for lithium-ion secondary battery, the ratio by mass of the silicon oxide to the total mass of the constituents except a binder is not less than x %.

Advantageous Effects of Invention

A lithium-ion secondary battery having excellent cycle characteristic and initial efficiency in addition to high capacity can be obtained by using the silicon oxide of the present invention as a negative electrode active material and by using the negative electrode material for lithium-ion secondary battery of the present invention.

BRIEF DESCRIPTION OF DRAWINGS

FIGS. 1 are schematic views of types of bonding each composed of silicon atom(s) having a dangling bond and closest atoms thereof that exist in a silicon oxide.

DESCRIPTION OF EMBODIMENTS

A silicon oxide of the present invention and a negative electrode material for nonaqueous electrolyte secondary battery using the same will be described hereafter.

1. Lithium-Ion Secondary Battery

FIG. 3 is a view showing a configuration example of a coin-shaped lithium-ion secondary battery using the silicon oxide and negative electrode material for lithium-ion secondary battery of the present invention. As shown in the same figure, a lithium-ion secondary battery 10 includes: a positive electrode 11, a negative electrode 13 including a negative electrode active material capable of occluding and releasing lithium ions, a lithium ion-conductive nonaqueous electrolytic solution, and a separator 15. Instead of the nonaqueous electrolytic solution, a polymer electrolyte may be used.

The positive electrode 11 comprises a counter electrode case 11a, a counter electrode current collector 11b, and a counter electrode 11c. The counter electrode case 11a doubles as a counter electrode terminal. The separator 15 is formed of a porous film of polypropylene, and impregnated with the electrolytic solution. The negative electrode 13 is composed of a working electrode case 13a, a working electrode current collector 13b, and a working electrode 13c. The working electrode case 13a doubles as a working electrode terminal.

The counter electrode case 11a is formed by spinning/drawing a stainless steel sheet having a Ni-plated outward surface. The counter electrode current collector 11b formed of a stainless steel net is spot-welded to the counter electrode case 11a. The counter electrode 11c is formed by pressure-fitting a circular lithium foil of a predetermined thickness onto a circular aluminum plate of a predetermined thickness disposed on the counter electrode current collector 11b.

The working electrode case 13a is formed of a stainless steel sheet with a Ni-plated outward surface. The working electrode 13c is made by using the silicon oxide as an active material, and pressure-formed integrally with the working electrode current collector 13b made of a stainless steel net.

A gasket 17, which mainly comprises polypropylene, is provided between the counter electrode case 11a and the working electrode case 13a to maintain the electric insulation between the counter electrode 11c and the working electrode 13c. The gasket 17, along with the working electrode case 13a whose outer periphery is bent inwards and swaged, functions to seal what are contained in the battery.

As the electrolytic solution to be impregnated in the separator 15, for example, a solution prepared by dissolving LiPF$_6$ to a mixed solvent of ethylene carbonate and dimethyl carbonate mixed in the proportion of 1:3 by volume so as to have a concentration of 1 mol/L can be used.

The negative electrode material to be used for the working electrode 13c may comprise the silicon oxide of the present invention (active material) which will be described later, other active materials, a conductive auxiliary agent, and a binder. The other active materials may not necessarily be added. As the conductive auxiliary agent, for example, acetylene black can be used. As the binder, for example, polyvinylidene fluoride can be used. The negative electrode material for lithium-ion secondary battery of the present invention contains not less than 20% by mass of the silicon oxide of the present invention, and an example of mixing is in the proportion of silicon oxide:acetylene black:polyvinylidene fluoride=70:10:20. By using the negative electrode material for lithium-ion secondary battery of the present invention, a lithium-ion secondary battery having excellent cycle characteristic and initial efficiency in addition to high capacity can be obtained.

The lithium-ion secondary battery 10 having the structure shown in FIG. 1 can have, for example, a diameter of 20 mm and a thickness of 1.6 mm. In this case, the diameter of the aluminum sheet constituting the counter electrode 11c is 15 mm, and the diameter of the lithium foil is 14 mm.

2. Silicon Oxide

The silicon oxide of the present invention satisfies conditions such that: the g-value, measured by an ESR spectrometer, is in the range of not less than 2.002 to not more than 2.005; and given that A, B and C are the area intensities of peaks near 420 cm$^{-1}$, 490 cm$^{-1}$ and 520 cm$^{-1}$ respectively in a Raman spectrum measured by Raman spectroscopy, A/B is not less than 0.5 and C/B is not more than 2. The peak area intensity ratios in the Raman spectrum are as explained above with reference to FIG. 2. The silicon oxide which satisfies the above-mentioned conditions is used as the negative electrode active material, whereby a lithium-ion secondary battery having excellent cycle characteristic and initial efficiency in addition to high capacity can be obtained.

The silicon oxide of the present invention preferably has a spin density in the range of not less than 1×10$^{17}$ spins/g to not more than 5×10$^{19}$ spins/g while satisfying the above-mentioned conditions about the g-value and the peak area intensity ratios in Raman spectrum. According to this, the initial efficiency of the lithium-ion secondary battery can be further improved.

In the silicon oxide of the present invention, when the spin density satisfies the above-mentioned condition, it is more preferable that the peak area intensity ratios in Raman spectrum satisfy conditions such that A/B is not less than 1 and C/B is not more than 0.1, from the viewpoint of further improvement in cycle characteristic and initial efficiency.

3. Method for Producing Silicon Oxide

Figure 4:
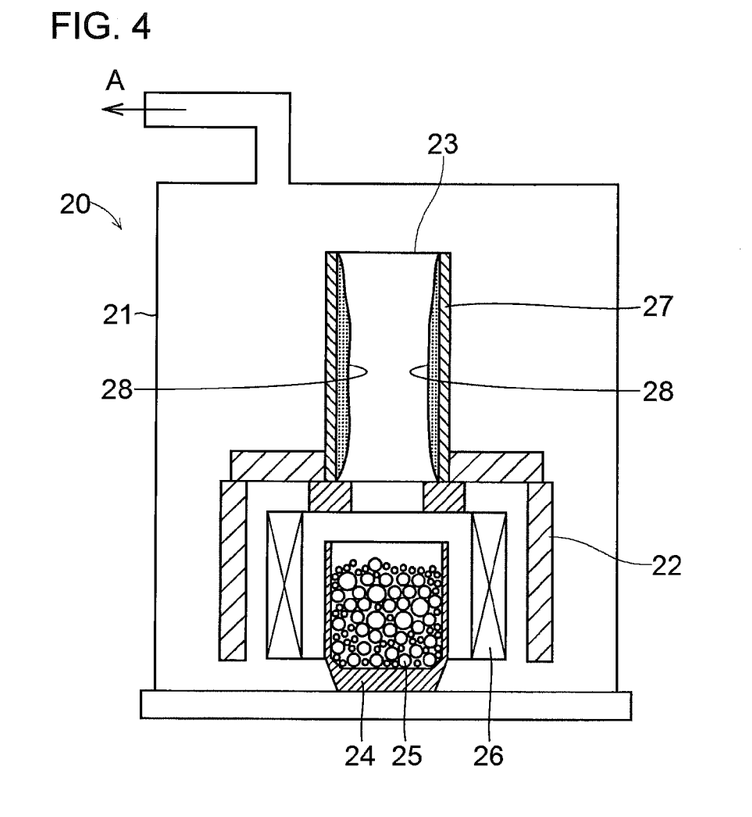
FIG. 4 is a view showing a configuration example of a production equipment for a silicon oxide.

FIG. 4 is a view showing a configuration example of a production equipment for a silicon oxide. A production equipment 20 includes a vacuum chamber 21, a raw material chamber 22 disposed inside the vacuum chamber 21, and a deposition chamber 23 disposed at an upper portion of the raw material chamber 22.

The raw material chamber 22 comprises a cylinder, and a cylindrical raw material container 24, and a heating source 26 surrounding the raw material container 24 are disposed at the center thereof. As the heating source 26, for example, an electric heater can be used.

The deposition chamber 23 comprises a cylinder disposed so as to have the same axis as the raw material container 24. A deposition substrate 27 formed of stainless steel is provided on the inner periphery of the deposition chamber 23 to vapor-deposit a gaseous silicon oxide generated by sublimation in the raw material chamber 22.

A vacuum device (not shown) for discharging atmospheric gas is connected to the vacuum chamber 21 containing the raw material chamber 22 and the deposition chamber 23, and the gas is discharged in the direction of arrow A.

In general, when the silicon oxide is produced by use of the production equipment shown in FIG. 4, a mixed pelletized raw material 25 is used as the raw material, the mixed pelletized raw material being prepared by blending silicon powder and silicon dioxide powder in a predetermined ratio followed by mixing, pelletizing and drying. The mixed pelletized raw material 25 is charged into the raw material container 24, and heated in an inert gas atmosphere or in vacuum to generate and sublimate SiO. The gaseous SiO generated by sublimation moves upwardly from the raw material chamber 22, enters the deposition chamber 23, and vapor-deposits on the surrounding deposition substrate 27 as a deposit silicon oxide 28. Thereafter, the deposit silicon oxide 28 is removed from the deposition substrate 27, and pulverized, whereby silicon oxide powder is obtained. Silicon oxides are conventionally produced by such a method.

As a result of investigations by the present inventors, it was found that when the thickness of the deposit silicon oxide is 1 mm or more, the peak area intensity ratios in Raman spectrum obtained from this silicon oxide are out of the range specified by the present invention, with a result of A/B being less than 0.5 or CB exceeding 2. This is because since the silicon oxide has a low thermal conductivity, a thick deposit silicon oxide causes the temperature on the deposition surface to rise by virtue of radiation of generated heat in a raw material reaction part within the raw material container as well as the heat of solidification, and the deposited silicon oxide is phase-separated into Si and SiO$_2$ at 400° C. or more.

It was also found that, in this case, the values of the g-value and the spin density are below the ranges set forth by the present invention respectively, with a result of the g-value being in the range of not less than 2.0016 to not more than 2.0018, and the spin density being in the range of not less than $1\times10^{16}$ spins/g to not more than $5\times10^{16}$ spins/g. This is because the strains existing inside the silicon oxides are alleviated.

Further, it was also found that when the thickness of the deposit silicon oxide is less than 1 mm, the values of the g-value and the spin density are below the ranges set forth by the present invention respectively, with a result of g-value being not more than 2.0014 and the spin density being in the range of not less than $3\times10^{16}$ spins/g to not more than $6\times10^{16}$ spins/g. This is because the deposit silicon oxide suddenly decreases in temperature after deposition due to a thinner thickness, and transforms into a porous structure. It was also found that the use of this silicon oxide as the negative electrode active material of a lithium-ion secondary battery causes serious reduction in charging/discharging capacity since the intercalation of lithium ions is inhibited by an oxide film formed on the surface of the deposit silicon oxide.

As a result of further examinations, the present inventors conceived the following production method. Namely, the inside of the vacuum chamber 21 is put into an inert gas atmosphere such as Ar or in vacuum and the deposition substrate 27 is prevented from being not directly exposed to the radiation heat generated in the raw material reaction part within the raw material chamber 24. On that basis, with a reduced deposition time, the deposit silicon oxide 28 is deposited in a thickness of 0.5-1 mm, and then the current-application to the heating source 26 is stopped to cool the deposit silicon oxide 28 to 200° C. Thereafter, Ar gas with an oxygen concentration in the range of not less than 0.1% by volume to not more than 30% by volume is introduced into the vacuum chamber 21 at a flow rate of 3 sccm until the inside of the vacuum chamber reaches the atmospheric pressure to substitute the gas within the vacuum chamber 21 thereby.

Using this method, various silicon oxides were produced by substituting the inside of the vacuum chamber 21 with Ar gas while varying an oxygen concentration within the above-mentioned range. As a result of examinations on these silicon oxides, it was found that when the oxygen concentration of Ar gas is in the range of not less than 10% by volume to not more than 15% by volume, the g-value is in the range of not less than 2.003 to not more than 2.005, the spin density is in the range of not less than $2\times10^{17}$ spins/g to not more than $4\times10^{18}$ spins/g, and the peak area intensity ratios in Raman spectrum satisfy conditions such that A/B is not less than 0.5 and C/B is not more than 2.

Further, it was also found that, by holding the silicon oxide, within the vacuum chamber 2, at a temperature of not higher than 400° C. where SiO causes no phase separation for a long time, the spin density can be increased while maintaining the g-value of the silicon oxide constant and, particularly, by holding at a temperature in the range of not less than 300° C. to not more than 400° C. for 2 hours, the spin density can be in the range of not less than $1\times10^{17}$ spins/g to not more than $5\times10^{19}$ spins/g.

EXAMPLES

The following tests were carried out to confirm the effects of the present invention, and results thereof were evaluated.

1. Test Conditions

As lithium-ion secondary batteries, those having the structure shown in FIG. 3 were used. As negative electrode materials for the lithium-ion secondary batteries, those containing 20% by mass of silicon oxide produced by use of the equipment shown in FIG. 4 were used. The forming conditions of silicon oxides are shown in Table 1.

TABLE 1

| Test No. | Class | Thickness [mm] | Cooled Temperature [° C.] | Type of Gas | Flow Rate [sccm] |
| --- | --- | --- | --- | --- | --- |
| 1 | Comparative Example | 10 | 200 | 100% Ar | 3 |
| 2 | Comparative Example | 0.90 | 200 | 100% Ar | 3 |
| 3 | Comparative Example | 10 | 200 | 80% Ar—20% O | 3 |
| 4 | Comparative Example | 0.2 | 200 | 80% Ar—20% O | 3 |
| 5 | Inventive Example | 0.5 | 200 | 80% Ar—20% O | 3 |
| 6 | Inventive Example | 0.8 | 200 | 80% Ar—20% O | 3 |
| 7 | Inventive Example | 0.67 | 200 | 80% Ar—20% O | 3 |

In Table 1, the "thickness" means the thickness of a deposit silicon oxide deposited on a deposition substrate, the "cooled temperature" means the temperature of the deposit silicon oxide cooled within the vacuum chamber after deposition, the "type of gas" means the type of the gas injected to the vacuum chamber until it reaches the atmospheric pressure after the deposit silicon oxide is cooled, and the "flow rate" means the flow rate of the injected gas.

2. Test Results

With respect to each of the silicon oxides produced in the above-mentioned conditions, the g-value, the peak area intensity ratio of Raman spectrum, and the spin density were measured, and further a lithium-ion secondary battery using each silicon oxide in the negative electrode material was evaluated using the initial efficiency and the initial discharging capacity as indexes. As the initial efficiency, the value of ratio of initial discharging capacity to initial charging capacity (initial discharging capacity÷initial charging capacity) of lithium-ion secondary battery was used. The result is shown in Table 2. In the same table, a comprehensive evaluation is also shown.

Each mark in the comprehensive evaluation is as follows: x means unallowable with initial efficiency of less than 85% or initial discharging capacity of less than 2000 mAh/g; ○ means allowable with initial efficiency of not less than 85%, and initial discharging capacity of not less than 2000 mAh/g; and ◎ means excellent with initial efficiency of not less than 90% and initial discharging capacity of not less than 2300 mAh/g.

TABLE 2

| Test No. | Class | g-value | Peak Area Intensity Ratio in Raman Spectrum | | Spin Density [spins/g] | Initial Efficiency [%] | Initial Discharging Capacity [mAh/g] | Comprehensive Evaluation |
| --- | --- | --- | --- | --- | --- | --- | --- | --- |
| | | | A/B | C/B | | | | |
| 1 | Comparative Example | 2.0015 | 1.1 | 0.2 | $3\times10^{16}$ | 48.30 | 1430 | X |

TABLE 2-continued

| Test No. | Class | g-value | Peak Area Intensity Ratio in Raman Spectrum | | Spin Density [spins/g] | Initial Efficiency [%] | Initial Discharging Capacity [mAh/g] | Comprehensive Evaluation |
| --- | --- | --- | --- | --- | --- | --- | --- | --- |
| | | | A/B | C/B | | | | |
| 2 | Comparative Example | 2.0030 | 0.1 | 2.5 | $5 \times 10^{16}$ | 52.30 | 1329 | X |
| 3 | Comparative Example | 2.0030 | 0.1 | 2.3 | $7 \times 10^{16}$ | 55.10 | 1488 | X |
| 4 | Comparative Example | 2.0017 | 1.1 | 3.4 | $2 \times 10^{16}$ | 17.20 | 105 | X |
| 5 | Inventive Example | 2.0020 | 3.6 | 0 | $3 \times 10^{16}$ | 89.80 | 2215 | ○ |
| 6 | Inventive Example | 2.0048 | 0.53 | 1.8 | $5 \times 10^{19}$ | 92.30 | 2433 | ◎ |
| 7 | Inventive Example | 2.0050 | 5.5 | 0 | $1 \times 10^{17}$ | 95.80 | 2323 | ◎ |

All of examples of Test Nos. 1 to 4, which are comparative examples, were rated as × in the comprehensive evaluation. In each example, the g-value and at least one of A/B and C/D of the peak area intensity ratios in Raman spectrum were out of the specified ranges of the present invention.

Test Nos. 5 to 7 are inventive examples, in which Test No. 5 was rated as ○ in the comprehensive evaluation, and Test Nos. 6 and 7 were rated as ◎ in the comprehensive evaluation. In each of these examples, both the g-value and the peak area intensity ratios in Raman spectrum were within the specified ranges of the present invention, and in Test Nos. 6 and 7, particularly, the spin density was within the range of not less than $1 \times 10^{17}$ spins/g to not more than $5 \times 10^{19}$ spins/g. With respect to the examples of Test Nos. 5 to 7, it was confirmed that the discharging capacity after repeating 100 times of charging/discharging is ensured to be 85% or more of the initial discharging capacity as the cycle characteristic.

INDUSTRIAL APPLICABILITY

Using the silicon oxide of the present invention as a negative electrode active material, and the negative electrode material for lithium-ion secondary battery of the present invention can ensure a lithium-ion secondary battery having excellent cycle characteristic and initial efficiency in addition to high capacity. Accordingly, the present invention is a technology useful in the field of secondary batteries.

REFERENCE SIGNS LIST

10: Lithium-ion secondary battery, 11: Positive electrode, 11a: Counter electrode case,
11b: Counter electrode current collector, 11c: Counter electrode, 13: Negative electrode
13a: Working electrode case, 13b: Working electrode current collector,
13c: Working electrode, 15: Separator, 17: Gasket, 20: Production equipment,
21: Vacuum chamber, 22: Raw material chamber, 23: Deposition chamber
24: Raw material container, 25: Mixed pelletized raw material, 26: Heating source
27: Deposition substrate, 28: Deposit silicon oxide

What is claimed is:

1. A silicon oxide to be used for a negative electrode active material of a lithium-ion secondary battery,
    wherein a g-value measured by an ESR spectrometer is in the range of not less than 2.0020 to not more than 2.0050; and
    wherein, given that A, B, and C are the area intensities of peaks corresponding to about 420 $cm^{-1}$, 490 $cm^{-1}$ and 520 $cm^{-1}$ respectively in a Raman spectrum measured by a Raman spectroscopy, A/B is not less than 0.5 and C/B is not more than 2.

2. The silicon oxide according to claim 1, having a spin density in the range of not less than $1 \times 10^{17}$ spins/g to not more than $5 \times 10^{19}$ spins/g.

3. A negative electrode material for lithium-ion secondary battery, comprising not less than 20% by mass of the silicon oxide according to claim 1.

* * * * *

UNITED STATES PATENT AND TRADEMARK OFFICE
CERTIFICATE OF CORRECTION

PATENT NO. : 8,932,548 B2  Page 1 of 1
APPLICATION NO. : 13/377249
DATED : January 13, 2015
INVENTOR(S) : Kizaki

It is certified that error appears in the above-identified patent and that said Letters Patent is hereby corrected as shown below:

In The Specification

Column 7, Line 47:

"shown in Fig. 1 can have, for example, a diameter of 20 mm"
should read
"shown in Fig. 3 can have, for example, a diameter of 20 mm"

Signed and Sealed this
Twenty-second Day of September, 2015

Michelle K. Lee
*Director of the United States Patent and Trademark Office*